July 9, 1935. R. E. McCLEARY 2,007,279
HYDRAULIC BRAKE
Original Filed Jan. 22, 1932 3 Sheets-Sheet 1

INVENTOR
Roy E. McCleary
BY
Carl H. Crawford
ATTORNEY

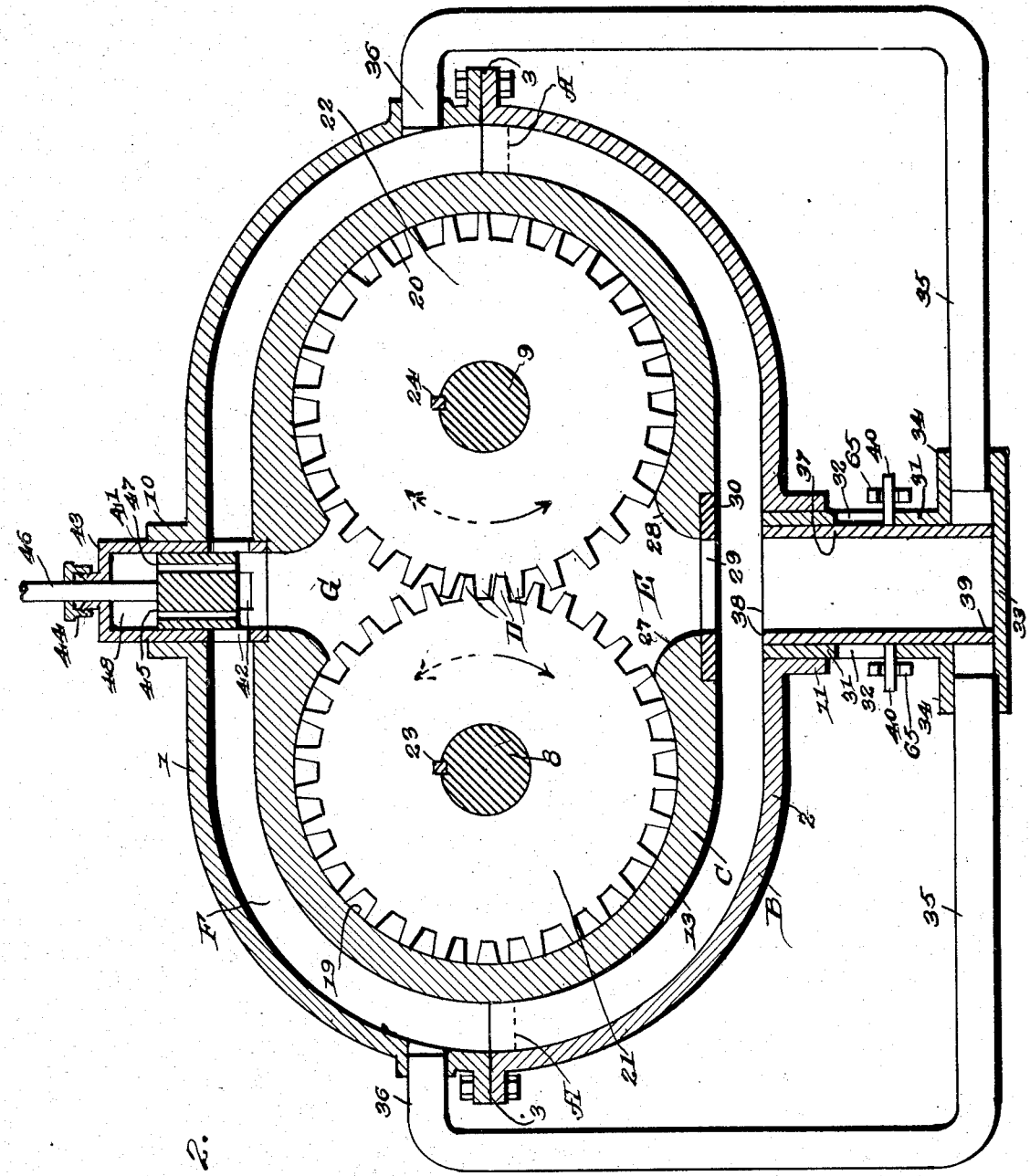

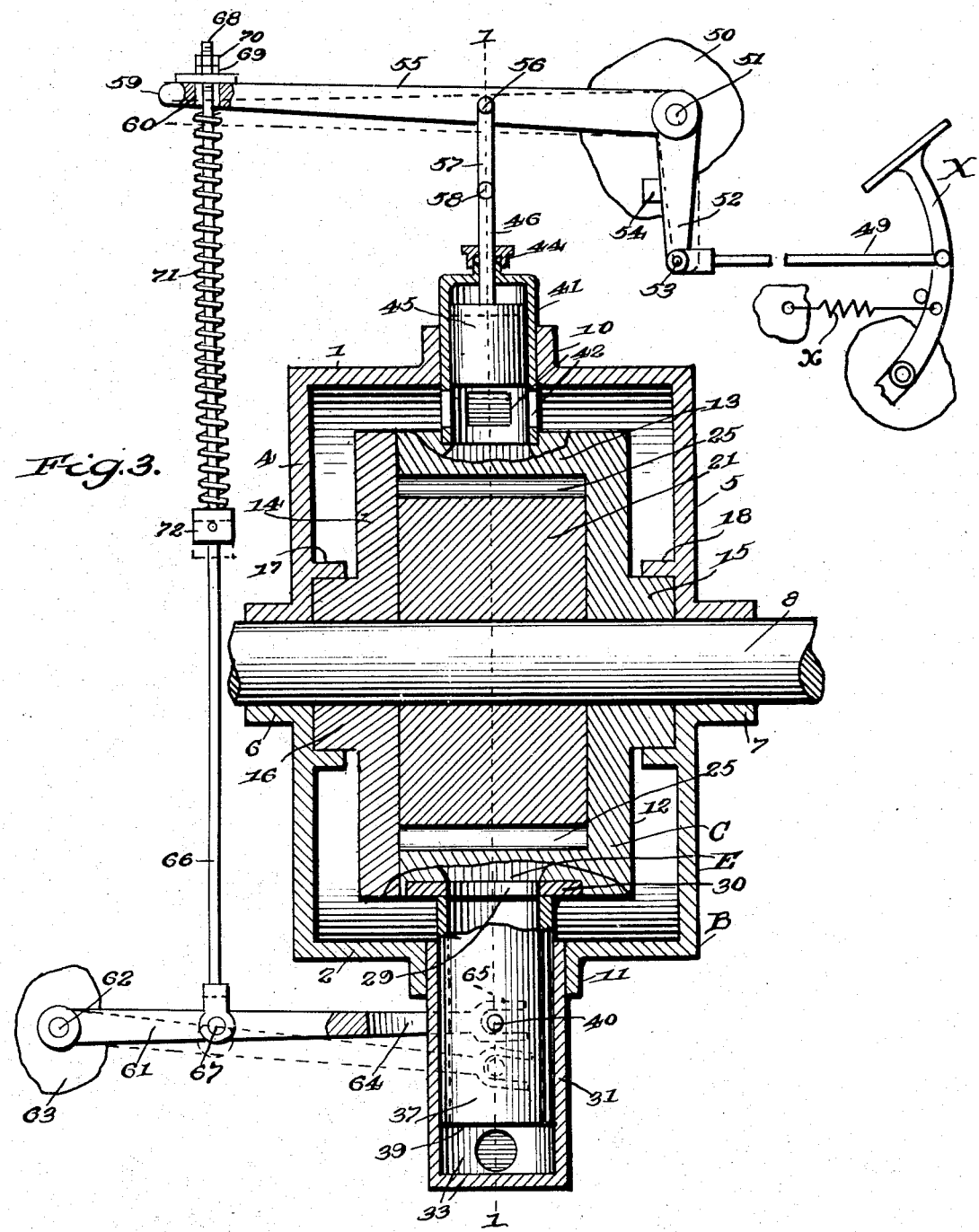

Patented July 9, 1935

2,007,279

UNITED STATES PATENT OFFICE 2,007,279

HYDRAULIC BRAKE

Roy E. McCleary, Seattle, Wash., assignor to McCleary Hydraulic Brake Co., Yakima, Wash., a corporation of Washington Application January 22, 1932, Serial No. 588,137
Renewed February 1, 1935

12 Claims. (Cl. 188—92)

The object of this invention is to provide a novel hydraulic brake.

The invention relates to that type of hydraulic brake in which vehicle driven parts or gears are disposed in a casing through which a braking medium, such as oil, is advanced by said driven parts, and in which passage of said medium through said casing is controlled in order to apply brakage to the vehicle.

In all brakes of this type known to me, great difficulty has been experienced in getting enough oil ingress properly to feed the gears. This has heretofore been especially difficult when a light braking application is made at relatively high speed of the vehicle, although the problem at low speeds and with relatively heavy braking application has also been serious. Further, it is important to afford a sufficient influx of air when no braking function is being performed. If the gears are "starved" from an ample supply of either oil or air, "whistling" and "singing" noises result, as well as a highly objectionable generation of heat.

It is the primary object of this invention to overcome the above and many other objectionable features and it is an especial feature of my invention, to afford an instant full or maximum ingress of oil to the gears immediately upon the application of a minimum, or anything more than a minimum, degree of brakage.

It is also a feature to completely and practically instantly shut off all ingress of air to the gears just as soon as oil is admitted thereto, whereby a complete and effective segregation of air and oil is rendered possible at the location of ingress of these mediums to the gears.

It is a feature of this invention to maintain a constant and maximum oil or air ingress to the gears while various degrees of braking applications are being made so that in any event, and irrespective of the extent of such applications, the gears will never be "starved" as regards either air or oil.

The invention involves congestion and supply valves, in the present embodiment, for controlling ingress to and egress from the gears, and a special feature resides in a differentially acting mechanism whereby said valves may be operated by actuation of the brake treadle in such a manner that either full air or oil ingress is afforded instantly upon the application of a minimum or anything more than a minimum of brakage.

The invention has many other features and objects which will be more fully described in connection with the accompanying drawings and which will be more particularly pointed out in and by the appended claims.

In the drawings:—

Fig. 2 is a sectional view similar to Fig. 1, with the parts in a braking adjustment.

Fig. 3 is a sectional view on line 3—3 of Fig. 1, and also illustrating the valve operating mechanism.

Like characters of reference designate similar parts throughout the different figures of the drawings.

Figure 1:
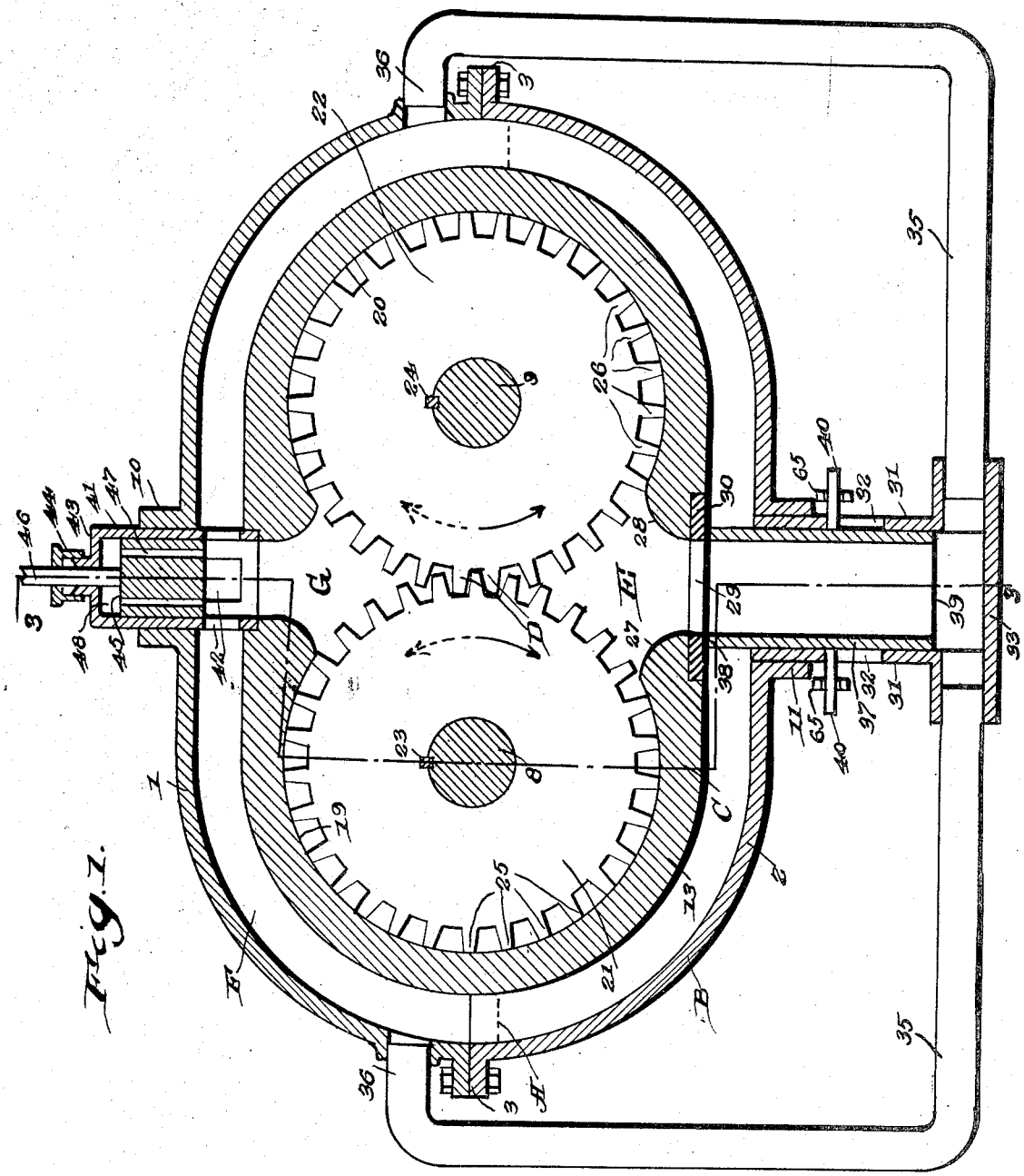
Fig. 1 is a sectional view of the preferred form of my improved brake taken on line 1—1 of Fig. 3, and showing the parts in a non-braking adjustment.

The drawings show the brake proper in which a housing is provided which may consist of upper and lower sections 1 and 2, respectively, which are rigidly united in any suitable manner at the horizontal juncture thereof, as indicated at 3. One function of this housing is to provide a suitable reservoir for the braking medium which usually is oil, and wherever I hereinafter refer to "oil" it will be understood that I am using this term generically as applying to any suitable liquid. I have shown the oil level at A, which is slightly below the line of juncture of the housing sections but which is sufficiently high so that the oil will seek its head by gravity and automatically enter the supply chamber when the latter is opened, as will hereinafter more fully appear. The sections 1 and 2, collectively, have side walls 4 and 5, as shown in Fig. 3, which are provided with bearings 6 and 7 for shafts 8 and 9, only those bearings for shaft 8 being shown. In the most improved construction, the brake structure will be interposed between the differential and the transmission mechanism, and the housing, which may be generally designated at B, will be suspended from the chassis directly, or indirectly, if incorporated in the transmission mechanism.

The upper section 1 has a flange hub 10 in which a congestion or braking pressure valve structure is adapted to be fitted and disposed, and the lower section 2, has a flange hub 11 in which a supply valve structure is adapted to be fitted and disposed, both of said structures being presently described.

Reference will next be made to the brake casing and the vehicle driven parts therein.

Said casing, which may be generally indicated at C, may consist of an integral casting having a side wall 12 and a horizontally disposed peripheral wall 13, extending laterally therefrom, as shown in Fig. 3. A removable wall 14 serves to close the internal chambers to be presently described. Wall 12, has a journal 15 for shaft 8, and a like journal, not shown, for shaft 9, and wall 14, has a journal 16, for shaft 8, and a like journal for shaft 9, the latter not being shown. Walls 4 and 5 of the housing, have flanges 17 and 18, respectively, engaging journals 15 and 16, whereby the brake casing C will be rigidly supported in the housing B.

Shaft 8, will be suitably connected to the vehicularly driven, preferably by the drive shaft, of which it may form a section, while shaft 9, is an idle shaft. The brake casing C is chambered at 19 and 20 to receive vehicle driven members which are shown in the form of gear wheels 21 and 22, and wheel 21 is suitably keyed on shaft 8, as indicated at 23, while wheel 22, may be likewise keyed to idle shaft 9, as indicated at 24. The gear wheels have teeth, 25 and 26, respectively, the outer ends of which closely fit the peripheries of the chambers 19 and 20, as shown, and said teeth are in mesh engagement at D. As shown in Fig. 3, the gears laterally fit closely against the walls 12 and 14, of the casing C. Now it will be clear that as the teeth 25 and 26, at their peripheries, fit closely against the walls 19 and 20, respectively, and at their ends fit closely against walls 12 and 14, that they form oil containing pockets in conjunction with said walls to carry oil from one point of their rotation to another.

In accordance with the present showing, it will be assumed that when the vehicle is moving forwardly, the gears 21 and 22 will rotate in the direction of the full line arrows shown in Figs. 1 and 2, and when the vehicle is moving backwardly, the gears will rotate in the direction of the dotted line arrows shown in said figures. In the present construction, I have invented a brake adapted and shown for applying brakage only against forward movement of the vehicle but will explain what action the parts take when the vehicle is moving rearwardly, later on, when I describe the operation.

On one side of the area of mesh engagement D, of the vehicle driven gears, which in the present construction, is on the lower side, I form what I will term an ingress or supply chamber E, the boundaries of which are the side walls 12 and 14, the converging teeth of the gears 21 and 22 toward the area of mesh D, and the diverging walls 27 and 28. The chamber E has an ingress opening 29, which may be formed in a valve seat plate 30, that is suitably recessed into and secured to the casing C. This opening, which during all braking functions, is always an ingress opening for oil but never an egress opening therefor in any braking capacity, communicates directly with the reservoir B. However, this opening 29, is an ingress and an egress opening for air, and in some extreme and exceptional cases an egress opening for small quantities of oil, as will hereinafter be more fully explained. However, it is important to note that this opening 29 and also the chamber E, have an ingress capacity both for oil and air that is in excess of the capacity of the teeth of both gears to absorb, so that whenever this opening is utilized, the gears cannot "starve" for either air or oil and thereby cause "whistling" or other noisy operation.

Reference will next be made to a supply valve structure the function of which is to control said opening 29 with respect to admission of the medium to be used.

Securely fitted in the flange hub 11, liquid tight, is a valve sleeve 31 which is provided with guiding and stop slots 32. Said sleeve 31 terminates in a head 33 against the bottom of which a valve, to be described, abuts, and which may be provided with one or more nipples 34, to each of which one end of a pipe or pipes 35 communicates, the remaining ends 36, thereof, opening to the reservoir B, above the oil level A, therein. In practice, the structure will be designed so that passages can be cored out to take the place of exteriorly disposed pipes 35, herein shown. However, in any event, it will be seen that the head 33 is in communication with the air space F, of the housing B, above the oil level A, therein.

A combined air and oil valve 37, is slidably mounted in sleeve 31 and is tubular in form. One end 38, of said valve 37, is adapted to seat against valve plate 30, as shown in Fig. 2, to shut off oil ingress and afford air ingress to supply chamber E. The remaining end 39, is adapted to close nipples 34, when the valve 37 is in the full oil ingress and air shut off position shown in Fig. 2. Said valve 37 is provided with studs 40, which project through stop slots 32 and extend outwardly therefrom for operative engagement with mechanism to be later described.

Reference will next be made to the congestion valve structure.

In the flange hub 10 is securely fitted a cap valve housing sleeve 41, having its lower intake end seated in a recessed portion of casing C. Said sleeve 41 has valve openings 42 which communicate with the air space F, and the upper end of said sleeve terminates in a cap 43, which is provided with a suitable packing gland 44. A congestion valve 45, is slidable in said sleeve 41, and is provided with an operating stem 46, that extends through gland 44, and which is adapted to be operated by mechanism that will hereinafter be fully described. In order to balance said valve 45 to render its operation relatively easy, I provide the latter with balance ports 47 so that oil under pressure may pass through the valve into the chamber 48, as will now be clear. In Fig. 1 valve 45 is shown in a sufficiently full upward or withdrawn adjustment to fully open ports 42, or in other words to permit a full flow of air when the parts are in the non-braking adjustment shown in said figure. In Fig. 2, the valve 45 is in a partial braking adjustment.

Between the congestion valve just described and the area of mesh engagement D, of the gears, is a congestion chamber G, formed similar to supply chamber E, and opening to the lower end of sleeve 41.

Reference will next be made to the mechanism for operating valves 37 and 45.

Referring to Fig. 3, I have shown a brake rod 49, which extends forwardly, or to the right of Fig. 3, and is pivoted to the brake treadle X, and when brakage is applied and the treadle is advanced to the right of said figure, rod 49 will be moved longitudinally to the right. It will be understood that the brake treadle will be spring controlled to be returned to a non-braking position when foot pressure or thrust thereagainst is released by means of spring x. A bell crank lever is pivotally mounted to any stationary part 50, at 51, and has a relatively short arm 52, that is pivoted at 53, to the inner end of said brake rod 49. If desired, a stop 54, may be provided to prevent the parts from moving beyond the position shown in full lines in Fig. 3.

Said bell crank lever is provided with a relatively long congestion valve arm 55 which is shown pivoted at 56, to a link 57, at the upper end of the latter, the lower end of said link being pivoted at 58, to stem 46, of the congestion valve closure 45. The outer or free end 59, of arm 55, is provided with an enlarged opening 60, the purpose of which will presently appear.

An ingress valve lever 61, is pivoted at 62, to any suitable stationary part 63, and the free end of said lever is forked or bifurcated to form arms 64 adapted to span sleeve 31. The terminals of said forked portions are bifurcated at 65, to slidably engage and operate said studs 40, to shift valve 37 into different positions.

A rod 66, has its lower end pivoted to lever 61, at 67, and its upper end 68 slidably projects through opening 60, and is threaded to receive a stop nut 69, and preferably a lock nut 70. These nuts not only function as a stop, but also afford a range of adjustability. An expansively acting spring 71, is interposed between said end 59 of lever 55 and a suitable stop or abutment 72, fixed on rod 66. In the non-braking adjustment or position shown in Fig. 3, the spring 71 is preferably not under compressive tension although it may be to a slight extent if desired.

The operation will next be described and reference will be made to the application of brakage against forward movement of the vehicle.

It may be informative initially to state that in the Fig. 1 position, the brake is in a non-braking adjustment, in which the congestion valve 45 is fully open for full egress passage of air outwardly and upwardly from the egressing or congestion chamber G, out through ports 42 and into the air space F.

From the air chamber or space F, the air passes through a pipe or pipes 35, to head 33, and upwardly through supply valve 37. As the upper end 38 of valve 37 is seated against plate 30, no oil from the reservoir B can enter the brake casing but air can flow freely into supply chamber E, and be carried around by gear teeth 25 and 26 and delivered to chamber G.

Thus, I have traced an endless path for the air and the parts will be so proportioned that the freest possible flow of air will be afforded with the supply and congestion valves in the full open position shown. Further, as no oil can enter the gears, and with a free flow of air, it will be seen that there will be no appreciable drag on the brake when the latter is in the non-braking position shown in Fig. 1. It necessarily follows that if there is an ample flow of air to and from the gears, no appreciable heat will be generated and the air itself will not be appreciably heated.

In the Fig. 2 position, the valve 37 is shown seated against head 33 thereby shutting off air to the interior of valve 37, and the upper end 38 is withdrawn from plate 30, whereby the oil in reservoir B will rise by gravity into chamber E, and suction of the gears will carry the oil around and deliver it to chamber G, and it will pass out ports 42 to air chamber F, and downwardly therein to the oil level in reservoir B. Thus, I have traced an endless path for the oil.

I will now enter into detailed description of the operation under various applications of brakage against forward movement of the vehicle.

Assuming that the parts were in the non-braking position shown in Fig. 1 and the driver wanted to apply the least or minimum brakage, he would advance the brake treadle X, and move rod 49, and therefore arms 52 and 55, from the full line, to the dotted line position shown in Fig. 3. This would merely lower or close congestion valve 45 from the full line to the dotted line position, as shown in the same figure, and ports 42 would only be covered to a very minimum extent and consequently, there would be very little oil congestion in chamber G. However, downward movement of end 59, of arm 55, to the dotted line position would act through spring 71, longitudinally on rod 66, to move lever 61 from the full line to the dotted line position, and because of the disposition of the connecting centers of the various parts, as clearly shown in Fig. 3, and which disposition is favorable to a greater movement of valve 37 than valve 45, it will be seen that the former is shifted from an extreme upper to an extreme lower position. This movement, which is favorable to valve 37, is clearly a leverage differential movement, in the specific form shown. However, broadly, it is a differential movement of the valves, irrespective of the means shown, within the limits of the definition claimed.

With this adjustment just described, it will be clear that oil will enter supply chamber E by gravity, as heretofore stated, up to the head level in the reservoir, and the air being shut off from pipes 35, as shown in Fig. 2, the gear teeth 25 and 26 will quickly discharge the moiety of air therein when the parts have changed their position, and expel such air outwardly through chamber G. Suction will instantly be set up in chamber E and the entering oil will be carried outwardly and upwardly by the gear teeth from chamber E and delivered to chamber G.

Now assuming that after the minimum brakage application had been made, the driver wishes to increase the same, then, all he would have to do would be to thrust the brake treadle X, a further extent to the right of Fig. 3, moving rod 49, correspondingly, until the congestion valve 45 had been closed to the Fig. 2, position. In further shifting the valve 45, and arm 55, no change in the position of supply valve 37 would result because spring 71 would yield and permit such further downward movement of arm 55, and as valve 37 was initially moved against head 33, the latter would act as a stop preventing further movement. Thus, increasing brakage application serves increasingly to hold valve 37 in the position to which it had been initially shifted. It will now be clear that closure 45 could be lowered to the extent of entirely closing ports 42 to any egress of oil from chamber G, without disturbing or in any way changing the position of valve 37.

In addition to an initial differential movement of valves 37 and 45, whereby the former is shifted to a greater extent than the latter, because of a difference of leverage, it will also be clear that by reason of the lost motion connection between the rod 66 and arm 55, I obtain a delayed or relatively sequential or successive movement of said valves due to the fact that valve 45 can be closed to any desired extent after valve 37 has reached, and been retained, in a final or terminal position.

As a direct result of the foregoing and very important feature, I can afford supply chamber E, an influx of oil under a minimum braking application in as great a volume as it would have under a maximum braking application, thereby preventing both heat and noise. It may be stated that it is at a relatively high speed, and with a light braking application, that the gears are most usually starved from an adequate supply of oil, although this condition is prevalent to a greater or less extent at all vehicle speeds and with any degree of braking application in prior brakes of this type, but not with that of the construction herewith presented.

After a maximum or any minimum brakage application has been made, and the driver desires to restore the parts to a normal or non-braking position, he merely releases the brake treadle which is spring restored to a non-braking position, and the parts will be restored to the Fig. 3, position, as shown in full lines. The end 59 will act upon the nut stop 69, to positively raise rod 66 and maintain it in a raised position as shown in full lines in said figure, with the upper end 38, of valve 37, firmly seated against plate 30. Thus, except for taking up the slack or resiliency of spring 71, in case the valve 45 had been moved downwardly near to or into an extreme position, it will be seen that restoration of the valves 45 and 37 to the non-braking position shown in full lines in Fig. 3, will be practically simultaneous.

It will of course be clear that when valve 37 has been moved to the braking position shown in Fig. 2, that the interior of said valve will be filled with oil unless it is desired to have a check valve therein, which is not necessary in actual practice.

It will also be clear that when valve 37 has been elevated to a non-braking position, as shown in Fig. 1, the oil in said valve will be free to enter pipes 35 to a certain extent. However, immediately upon restoration of valve 37 to the Fig. 2, position, oil will rush upwardly therein to satisfy suction of the gears 21 and 22, and this oil will be bodily lifted into chamber E and expelled by the gears out through chamber G. Thereafter, as long as the brake is in a non-braking adjustment, a free flow of air will negotiate the endless path previously pointed out. In the event that all of the oil in valve 37, and head 33, was not elevated and expelled, it would do no harm and would not result in either noise or heat.

In all the foregoing, the operation has been described with relation to forward movement of the vehicle and with the gears turning in the direction of the full line arrows shown in Fig. 1. Now it will be clear that as this brake is not designed to arrest rearward movement of the vehicle, the parts will remain in the non-braking adjustment shown in Fig. 1, when the vehicle is backed up, or backs up on a downward incline. The usual band brakes are to be used to arrest rearward movement. Consequently, upon rearward movement, and with the parts in a non-braking adjustment, the gears 21 and 22 would revolve in the directions shown by the dotted line arrows in Fig. 2, and the air path would be the reverse of that heretofore described. Hence, the air would be expelled into chamber E, through valve 37, and pipes 35, back to air space F, and through ports 42 into chamber G, completing the endless path through gears 21 and 22. As backward movement is seldom if ever rapid, relatively speaking, or for great distances no difficulty would be experienced in such reversal.

Now suppose the driver, during backward movement of the vehicle, made a mistake and actuated the brake treadle, then, in that event, the gears 21 and 22, revolving in the direction of the dotted line arrows, would simply pump air from chamber G, into chamber E, and this air would be forced out of opening 29 and through the oil in the reservoir and back up into chamber or air space F, without performing any braking function. No harm or injury would result and such a false and abnormal application would seldom be made, and upon release of such false braking application, the parts would instantly be restored and would function in the usual manner, as hereinbefore described.

It will be understood that immediate full ingress of oil is afforded to chamber E, when any maximum braking application is made, as well as when a minimum application is made.

It will be noted that in one shifting movement, the supply valve 37 simultaneously functions to shut off oil and open air ingress to the vehicle driven parts, and in another shifting movement, it functions to shut off air and open a full ingress of oil to the vehicle driven parts. When valve 37, is in a non-braking position, oil is shut off from the vehicle driven parts to prevent oil drag on the brake when no braking function is being performed.

In applying brakage, the congestion valve 45 is first moved into a congesting position and immediately thereafter the supply valve 37 is moved into a full oil ingress position and hence the action imparted to said valves in this initial operation, is sequential. However, after this initial application of brakage has been made, and congestion valve is moved into a further position of congestion, valve 37 does not move and hence, at this period of the operation, there is an absence of sequence.

When the valve 45, has been retracted from a congesting position, valve 37 is instantly shifted from a full oil ingress to a full air ingress position. However, during the first portion of the retracting movement of valve 45, the lost motion of rod 66 and lever 55 will not have been taken up and consequently while the end 59 is moving toward nut 69, the valve 45 has partaken of a certain movement before valve 37 has been shifted, hence, even in the change from a braking to a non-braking position of the parts, there is a successive or sequential movement of the valves 37 and 45. Therefore, it will now be clear that at times there is a sequential movement of the valves and at other times, a non-sequential actuation thereof by the differential mechanism.

Hence, because of the lost motion connection between arm 55 and rod 66, the intake valve 37 and egress valve 45, are not operated in predetermined and fixed relation with respect to each other. In other words, they are not operated uniformly and in the same manner but rather selectively, since valve 45 can be moved to any desired congestion position after valve 37 has reached a full or extreme position.

It is believed that the method and apparatus of this invention will be fully understood from the foregoing description, and while I have herein shown and described one specific form of this invention, I do not wish to be limited thereto except for such limitations as the claims may import.

I claim:—

1. In a hydraulic brake, a casing having supply and congestion chambers, vehicle driven means in said casing for advancing oil from said supply to said congestion chamber in applying brakage, and mechanism opening full ingress of oil to said supply chamber simultaneously with the establishment of any degree of congestion in said congestion chamber and thereafter causing various degrees of congestion in said congestion chamber and maintaining a constant ingress to said supply chamber.

2. In a hydraulic brake, a casing having supply and congestion chambers, vehicle driven gears in said casing for advancing oil from said supply to said congestion chamber, a congestion valve for said congestion chamber, a supply valve for said supply chamber, and treadle operated mechanism for selectively imparting a minimum or more of congestion movement to said congestion valve and a full oil ingress movement to said supply valve.

3. In a hydraulic brake, a casing having supply and congestion chambers, vehicle driven gears in said casing for advancing oil from said supply to said congestion chamber, and treadle operated mechanism for selectively controlling congestion in said congestion chamber and ingress of oil to said supply chamber.

4. In a hydraulic brake, a casing having a supply chamber provided with a combined air and oil controlling supply valve and a congestion chamber provided with a congestion valve, vehicle driven gears in said casing for advancing air or oil therethrough from said supply to said congestion chamber, and treadle operated mechanism for operating said valves to afford air passage through said casing and shut off oil passage when no braking function is being performed and moving said congestion valve into a congestion position and moving said supply valve to shut off air and open full ingress of oil in applying brakage.

5. In a hydraulic brake, a casing having a supply chamber for passage of either air or oil, said casing having a congestion chamber and a congestion valve therefor, vehicle driven members in said casing for causing passage of air or oil from said supply to said congestion chamber, a valve device for said supply chamber, and means for selectively operating said congestion valve and instantly moving said valve device into either full air or oil shut-off or full air or oil ingress position, whereby the air and oil will be segregated in braking and non-braking adjustments of said brake.

6. In a hydraulic brake, a casing having a supply chamber provided with a supply valve for controlling passage of either air or oil to said chamber, said casing having a congestion chamber provided with a congestion valve, vehicle driven gears in said casing for causing passage of air or oil from said supply to said congestion chamber, and selective mechanism for operating said supply valve instantly from a full oil ingress to a full air ingress position when said congestion valve has been retracted from a congestion position.

7. In a hydraulic brake, a casing, vehicle driven means in said casing, supply and congestion valves for controlling passage of different mediums through said casing, a brake treadle, a congestion valve lever operatively connected with said brake treadle and with said congestion valve, a supply valve lever operatively connected with said supply valve, and a yielding lost motion mechanism operatively connected with said congestion and supply valve levers for differential operation of said valves on movement of said brake treadle.

8. In a hydraulic brake, a casing, vehicle driven means in said casing, supply and congestion valves for controlling passage of different mediums through said casing, a congestion valve lever for said congestion valve, a supply valve lever for said supply valve, lost motion means operatively connecting said levers with each other, and a brake treadle operatively connected with one of said levers for causing operation of said valves.

9. In a hydraulic brake, a casing, vehicle driven means therein, supply and congestion valves for controlling passage of a braking medium through said casing to apply brakage, and differentially acting mechanism operating said valves sequentially through one period of movement thereof and non-sequentially through another period of movement thereof.

10. In a hydraulic brake, a casing, vehicle driven means therein, supply and congestion valves for controlling passage of a braking medium through said casing to apply brakage, and mechanism for operating said congestion valve to cause either a sudden extreme or various gradations of congestion and operating said supply valve substantially instantly into either of its extreme positions.

11. In a hydraulic brake, a casing, vehicle driven means in said casing, a supply valve for admitting oil to said casing, a congestion valve for retarding egress of oil from said casing to apply brakage through said means, and mechanism yieldingly shifting and holding said supply valve into a full oil ingress position and operating said congestion valve to cause either a sudden extreme or various gradations of congestion while said supply valve is maintained in a full oil ingress position.

12. In a hydraulic brake, a casing, vehicle driven means in said casing, a supply valve for admitting oil to said casing, a congestion valve for retarding egress of oil from said casing to apply brakage through said means, and mechanism for shifting and holding said supply valve in a full oil ingress position and operating said congestion valve to apply any gradation of retardation of oil egress while said supply valve is held in a full open oil ingress position by said mechanism.

ROY E. McCLEARY.